United States Patent [19]

Adams

[11] Patent Number: 4,985,761

[45] Date of Patent: Jan. 15, 1991

[54] CURRENT DETECTION CIRCUIT AND METHOD

[75] Inventor: David G. Adams, Plano, Tex.

[73] Assignee: Spectradyne, Inc., Richardson, Tex.

[21] Appl. No.: 318,166

[22] Filed: Mar. 2, 1989

[51] Int. Cl.[5] .............................................. H04N 17/04
[52] U.S. Cl. ......................................... 358/84; 455/2;
340/664; 307/131; 307/361
[58] Field of Search ............... 358/84; 455/2; 340/664;
307/131, 361

[56] References Cited

U.S. PATENT DOCUMENTS

| 4,138,627 | 2/1979 | Camic | 340/664 |
|---|---|---|---|
| 4,255,669 | 3/1981 | Naugle | 307/131 |
| 4,529,931 | 7/1985 | Kuhns | 324/117 R |
| 4,558,310 | 12/1985 | McAllise | 340/664 X |
| 4,574,304 | 3/1986 | Watanabe et al. | 358/84 |
| 4,605,958 | 8/1986 | Machnik et al. | 358/84 |
| 4,620,444 | 11/1986 | Young | 73/606 |
| 4,709,223 | 11/1987 | Crapanzano | 340/453 |
| 4,723,302 | 2/1988 | Fulmer et al. | 358/84 X |

OTHER PUBLICATIONS

National Semiconductor, *Linear Applications Handbook* 1, 1973, applicants note 20, "An Applications Guide for Operational Amplifiers", Feb. 1969, pp. AN20-1 to AN20-12, see especially, p. AN20-5.

*Primary Examiner*—Jin F. Ng
*Assistant Examiner*—Stella L. Woo
*Attorney, Agent, or Firm*—Sigalos, Levine & Montgomery

[57] ABSTRACT

An apparatus for sensing operational status of a system including a television set includes a reference source, means for determining a level of operation of the system, and means for comparing the level of operation of the system to the reference source.

15 Claims, 3 Drawing Sheets

CURRENT DETECTION CIRCUIT AND METHOD

BACKGROUND OF THE INVENTION

1. Field of the Invention

This invention relates to sensing apparatus and, more particularly, to sensing apparatus for mOnitoring the operation of alternating current powered devices.

2. History of Prior Art

A variety of systems have heretofore been developed to monitor the operation and/or status of electrically powered apparatus. For example, various types of test equipment, well known to those skilled in the art, have been developed to provide information as to both the instantaneous electrical activity of a circuit as well as its electrical activity over time. As a subset of the above, a variety of systems heretofore have been developed to monitor the operation of television sets. The purpose of some of these systems is to help collect data indicative of the popularity of particular television programs. The Nielsen rating system is an example of such a system. The purpose of other television set monitoring systems is to collect information regarding whether a hotel guest is watching a playing of a videotaped motion picture or similar program for which that guest is willing to pay. The Spectravision ® Movie System, which brings recently-released guest-pay movies to hotel guests over their in-room televisions, is a prime example of one of these types of systems.

During the operation of the above-described systems, any number of a variety of parameters are sensed as part of the overall monitoring operations For example, the basic on-or-off state of the television set may be monitored and, in addition, when the television is on, exactly which channel has been selected by a viewer. Yet another parameter which may be monitored is the length of time that the television is on with a single, particular channel being selected for viewing. In the Spectravision ® system mentioned above, for example, a cumulative timing circuit is employed to determine when a viewer has watched a pay channel for a predetermined period of time, e.g., five minutes, after which time other circuit elements cause a preselected charge to be added to the viewer's room bill. There are a multitude of other parameters, in addition to those mentioned above, that may be sensed in television operation monitoring systems.

In addition to parameter sensing circuits, television monitoring systems generally also include means for causing certain actions to occur based upon the results or outputs of the sensing circuits. In the Nielsen rating system, for example, data regarding the programs being watched on a particular television set in a selected household are forwarded to a central data collection point where the information is collected and tabulated to produce statistically correlated popularity ratings of each television program in different viewer markets. In the Spectravision ® system, circuitry is included that disables the sensing of individual room movie selection keys when the television set in that room is turned off, thus ensuring that a hotel guest does not inadvertently select (and be billed for) a movie while the television is turned off.

The monitoring systems described above, while effective in many situations, have proven to have certain shortcomings. Many of these shortcomings relate to the fact that it is frequently desired to control certain responses based upon different levels of electrical activity, as opposed to situations in which there is either some electrical activity or there is not. The latter situation would exist, for example, when different desired responses would be actuated depending upon whether a television set was either on or off. This is a fairly easy condition to sense. The former situation, i.e., where it is desired to detect subtle differences between levels of electrical activity, is one in which the shortcomings of prior art monitoring systems have been particularly noticeable. For example, certain portions of recent vintage hotel television sets (e.g., warm-up circuitry and/or built-in clocks, radios and similar apparatus) are always operational and/or are independently operational of the audio/video portion of the television set. These circuits may either continue to operate or can even become disabled when the television receiving circuitry is activated by a user for viewing. Thus, most hotel in-room television sets are never simply on or off; rather, there are various levels of electrical activity based upon which circuits within the set are operating.

Simply put, a shortcoming of prior art television monitoring systems is that they have not been able to produce effective status responses in cases in which a television system has a variety of electrical operational levels and the particular desired response differs depending upon the particular level at which the television system is operating.

SUMMARY OF THE INVENTION

The present invention overcomes the shortcomings mentioned above by providing an apparatus for sensing operational status of a system, notwithstanding the fact that the system may have multiple positive operational levels. In broad terms, the apparatus of the present invention includes a reference source, a means for determining a level of operation of the system, and means for comparing the level of operation of the system to the reference source. Stated more specifically, embodiments of the present invention include a current sense transformer having a primary winding interconnecting an AC line source and a device to be monitored, the current sense transformer further having a secondary winding with connectable end points; a summing amplifier having two input terminals, each connected to one of the connectable end points of the secondary winding of the current sense transformer, the summing amplifier further having an output terminal; a positive peak detection circuit having an input terminal and n output terminal, the input terminal connected to the output terminal of the summing amplifier; a negative peak detection circuit having an input terminal and an output terminal, the input terminal connected to the output terminal of the summing amplifier; a differential amplifier having two input terminals and an output terminal, one of the input terminals connected to the output terminal of the positive peak detection circuit, the other of the input terminals connected to the output terminal of the negative peak detection circuit; a reference voltage source having an output terminal; and a comparator having two input terminals and an output terminal, one of the input terminals connected to the output terminal of the differential amplifier and the other of the input terminals connected to the output terminal of the reference voltage source. The method of the present invention, in broad terms, includes the steps of establishing a reference value, determining a level of activity of the system, and comparing the level of activity of the system to the reference value.

Accordingly, an object of the present invention is to provide an apparatus for detecting the level at which a system capable of operating at multiple levels is operating.

Another object of the present invention is to provide a means for sensing when an AC powered device, such as a television set, is turned on, the circuit being insensitive to the normal "off-state" currents of the AC-powered devices, while handling the wide varieties of current wave forms and levels which may exist from device to device and while operating over varying AC line conditions.

Yet another object of the present invention is to provide a circuit that may be usefully employed in a system for monitoring the popularity of television shows.

Still yet another object of the present invention is to provide a circuit that may be usefully employed in a system such as the Spectravision ® movie system.

Other objects, advantages and novel features of the present invention will become apparent from the following detailed description of the invention when considered in conjunction with the accompanying drawings wherein:

DETAILED DESCRIPTION OF THE INVENTION

The present invention, and the applications and operation thereof, will now be described in detail in terms of the Spectravision ® system. The details regarding the Spectravision ® in-room television system are set forth herein solely to highlight one specific utility of the present invention. Accordingly, it should be remembered that the present invention may be usefully employed in any number of different apparatus and in a multitude of different situations.

Figure 1:
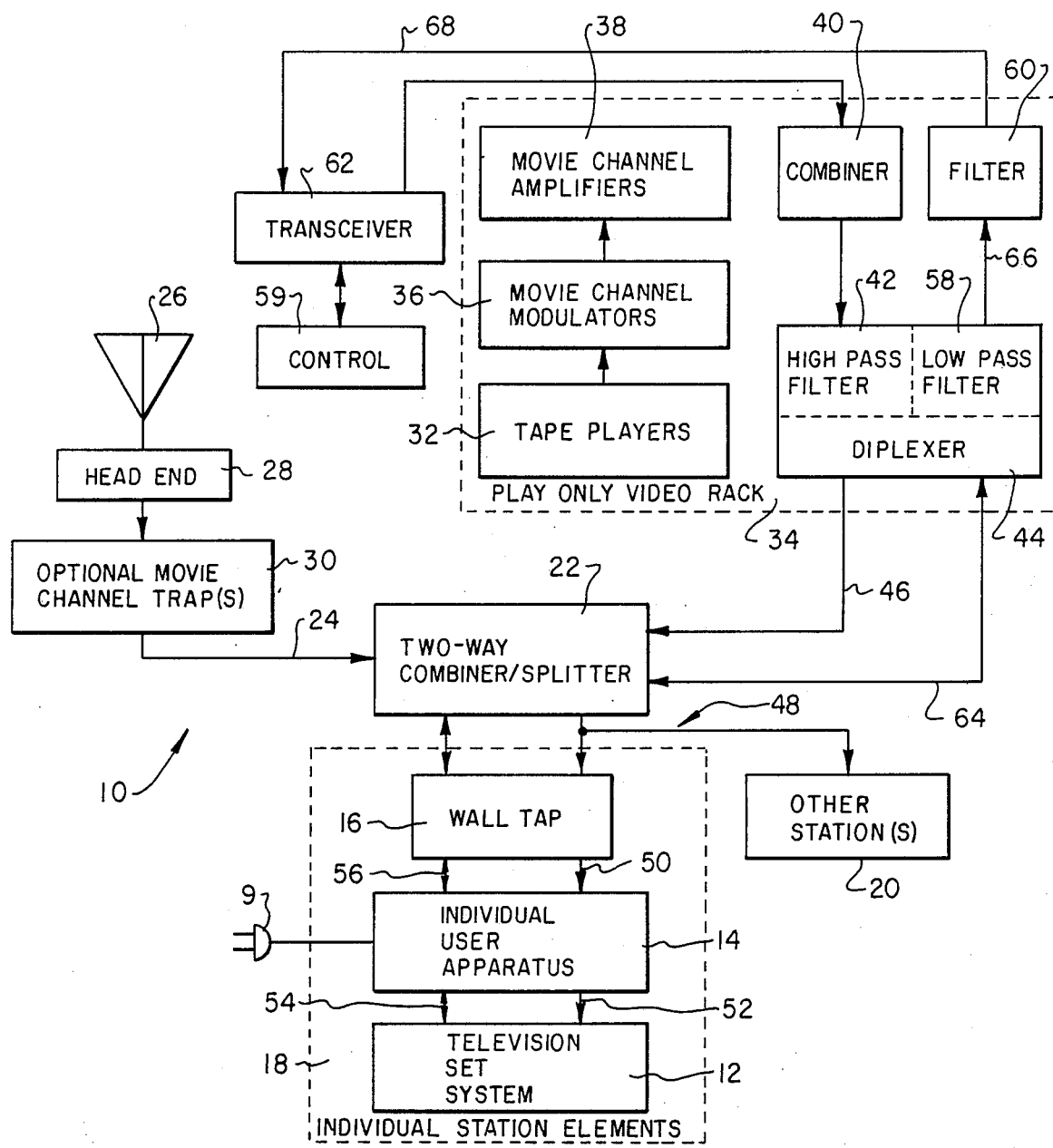
FIG. 1 is a block diagram of a system for selectively providing standard broadcast television signals, television premium movie channel signals, or pay movie signals via cable to an individual television user station.

Referring first to FIG. 1, a television station/premium movie channel/pay movie system, generally designated by reference numeral 10, is shown therein. This type of system is increasingly being employed to provide a range of viewing options to a television viewer in, for example, a hotel room. The system operates to provide via R.F. cable standard television station broadcasts and premium movie channel signals, as well as movie signals for which a viewer may pay, to the various channels of a television set system 12.

Television set system 12, together with an individual control user apparatus 14 and a wall tap 16, constitute typical elements found within an individual station 18 within the overall system 10. Television set system 12 may be one of any number of conventional, commercial television sets. The television set 12 may be of a type that is either completely on or off, so that it consumes absolutely no power when it is off. More likely, however, set 12 may have any number Of subsystems which consume power independently of whether the television set is on or off for viewing purposes. For example, the television set system 12 may include conventional instant-on circuitry that is either operational at all times or When the television set is turned off in order to decrease its warm-up time. Similarly, the television set system 12 may have a built-in clock that is operational at all times or a radio that can be operated when the television set is not being used for viewing purposes. Needless to say, numerous permutations and other possible subsystems are possibly included within the television set 12 in order to enhance user comfort and convenience.

Individual user control apparatus 14 and wall tap 16, as well as a conventional AC outlet 9 connected to the control apparatus 14 perform important roles in supplying power and certain signals to television set system 12. Individual user control apparatus 14 is generally positioned between the wall tap 16 and the television set system 12 with current directed thereto to facilitate control of television set system 12 based upon various information received and/or sent by user control apparatus 14. Being positioned between television set system 12 and an AC conventional outlet allows control apparatus 14 to sense whether the television set is in a state in which the apparatus 14 should be operational, and to disable itself when the television set is in a state in which it should not be operational. Being positioned between the television set system 12 and the wall tap 16 (wall tap 16 being a point of connection to outside station signal lines, typically via a coaxial cable), allows the individual user control apparatus 14 to modify signals from the outside station signal lines to the television set and generate signals onto the outside lines.

As indicated by block 20, system 10 may include a number of other stations like station 18. A typical system in a hotel would have one station per room.

System 10 in FIG. 1 has three different types of signals being sent to television set 12. These signals are standard television broadcast signals, premium movie channel signals and pay movie signals. The first two of the three types of signals, that is, standard television broadcast signals and premium movie channel signals, are fed to a conventional two-way combiner/splitter 22 via line 24. The standard broadcast signals are captured by conventional antenna 26 and fed to a conventional head end 28. The premium movie channel signals are captured by conventional optional movie channel traps 30 disposed in circuits between the head end 28 and the two-way combiner/splitter 22. As mentioned above, both the standard television broadcast signals and the premium movie channel signals are fed together on line 24 to splitter 22.

The third type of signals, the pay movie signals, are generated by tape players 32 within a play only video rack 34. These signals are modulated by movie channel modulators 36, amplified by amplifiers 38, and passed on to a combiner 40. Thus, a number of pay movie options are available to be sent to each station 18, 20. These multiple pay movie signals are fed to a VF high pass filter portion 42 of a conventional duplexer 44, whereupon they are further fed over a line 46 to two-way combiner/splitter 22. From combiner/splitter 22, a signal including a standard television broadcast signal, a premium movie channel signal, and a pay movie signal, is available to be sent to each individual station 18, 20 via additional lines generally designated by reference numeral 48. Within each individual station, the combined signal is fed to an individual user control apparatus 14 via line 50, and on to television set system 12 via line 52.

As is further described below, individual user control apparatus 14 includes circuitry to cause various responses based upon certain states of operation of the television set system 12. For example, when a television set is used to view a pay movie, by selecting a particular pay movie channel with the individual user control apparatus 14, data indicating that fact is sent back to a control processor through wall tap 16, the two-way combiner/ splitter 22 and lines 54 and 56. Data from the user control 14 travels to a control 59 through the LF low pass filter portion 58 of duplexer 44, filter 60, and transceiver 62. As shown in FIG. 1, line 64 interconnects two-way combiner/splitter 22 and duplexer 44, line 66 interconnects low pass filter portion 58 and filter 60, and line 68 interconnects filter 60 and transceiver 62. The transceiver 62 allows transmission of polling signals from the control 59 to each individual station 18, 20. Thus, the system of FIG. 1 includes means to instantaneously determine station status periodically over time, so that the central control 59, which also includes accounting control means, can bill an individual station for viewing a pay movie after that movie has been viewed for a predetermined period of time.

Figure 2:
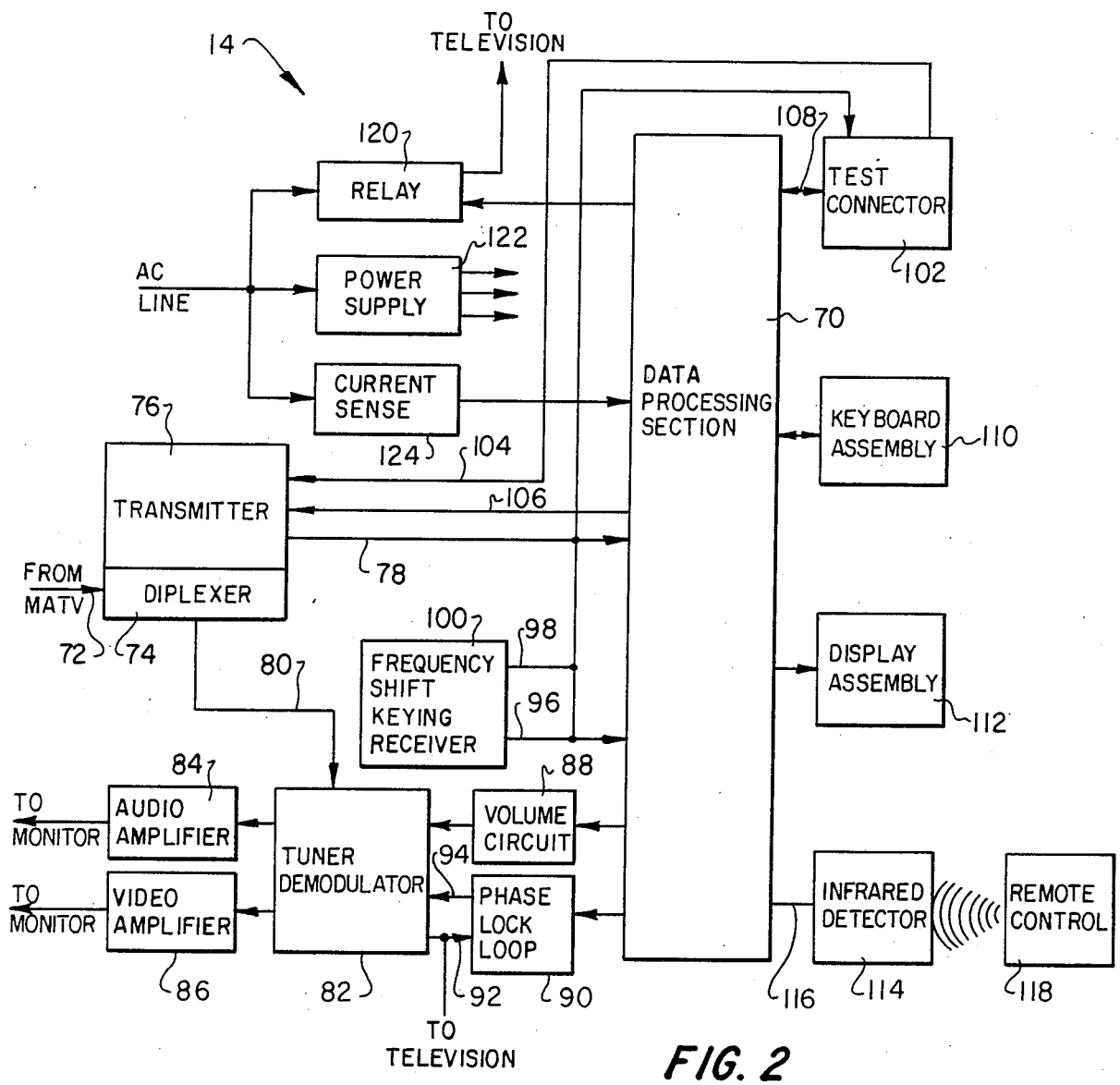
FIG. 2 is a block diagram of the major subcomponents of an individual user television apparatus such as one employed in the system of FIG. 1.

Referring now to FIG. 2, individual user control apparatus 14 is shown in more detail. A major component of the individual user control apparatus 14 is a data processing section 70, comprising a conventional microprocessor. Most of the other elements within individual user control apparatus 14 interface with data processing section 70 to some extent.

It should be recalled and understood from the discussion of FIG. 1 that master antenna television or MATV signals, as well as data signals from transceiver 62, are input into individual user control apparatus 14. In FIG. 2, MATV signals are shown to pass along line 72 into duplexer 74 which functions to separate incoming data signals from incoming television stations and movie signals. The data signals are sent by transmitter 76 to the data processing section 70 over line 78. The television station and movie signals, on the other hand, are fed over line 80 to a tuner demodulator 82.

The tuner demodulator 82 performs several functions. First, it functions to demodulate the television station and movie signals into baseband audio and video signals that can be passed through an audio amplifier 84 and a video amplifier 86, respectively, whereupon those amplified audio and video signals can be supplied via jacks (not shown) to lines connected to a monitor that can be installed as an individual user station instead of a television set. Second, demodulator 82 also allows a volume control capability to be built into individual user apparatus 14 and the audio baseband signals are fed through a volume circuit 88. Within the tuner demodulator 82 is a RF modulation portion (not shown) that remodulates the baseband signals back to a frequency corresponding to a particular channel, e.g., channel 3, for television viewing through the sets conventional tuner. Thus, the television station and movie signals are effectively demodulated and remodulated, primarily to allow volume control within the individual user control apparatus 14.

The phase lock loop 90, comprising a conventional circuit for synchronizing a variable local oscillator with the phase of a transmitted signal, allows the microprocessor 70 to select the particular channel the viewer indicates (by means discussed below) he or she wishes to watch. Phase look loop 90 is, in essence, a frequency control circuit and prescale signals are sent from tuner demodulator 82 to phase lock loop 90 over line 92. These same signals are sent to television set system 12. In the reverse direction, that is, from phase lock loop 90 to tuner demodulator 82, tuning signals are carried over line 94.

Various control signals, TXD, RXD, DCD, and CONTX perform selected functions within individual user control apparatus 14. DCD and RXD signals are present in lines 96 and 98 between a frequency shift keying receiver 100 and a test connector 102. RXD signals also are sent directly from frequency shift keying receiver 100 to the microprocessor 70. As mentioned above, data or TXD signals are transmitted from transmitter 76 to microprocessor 70, as well as to test connector 102. CONTX signals pass in both directions between transmitter 76 and test connector 102 via line 104. TX signals pass directly from microprocessor 70 to transmitter 76 along line 106. Finally, command data signals can pass directly back and forth between microprocessor 70 and test connector 102 on line 108.

A number of various subelements are connected to microprocessor 70. First, a keypad assembly comprising a means for a potential viewer to punch a channel number selection, forms part of individual user apparatus control 14 and is designated by reference numeral 110. A display assembly 112, which can indicate to the user the channel selected or other data, also forms part of individual user control apparatus 14. An infrared detector 114, connected to microprocessor 70 via a line 116, allows remote transmission of commands and, thus, remote control of various functions of the individual user control apparatus 14 by, e.g., a conventional handheld remote television control unit 118.

The final major subelements of the individual user control apparatus 14 to be discussed are the power-related elements, i.e., a relay 120, a power supply 122, and a current sense circuit 124. Power supply 122 simply provides the various voltages, e.g., plus five volts, plus twelve volts, etc. required for the individual user control apparatus operation. Relay 120 is disposed between an AC power source and the television set system 12 so that, under certain conditions detected by current sense circuit 124, the relay 120 can be caused to respond in a manner having a desired on-off effect on the television set 12. The current sense circuit 124 forms a very important part of the present invention and is described in detail below.

Before discussing the current sense circuit 120 in further detail, it should be noted that the subelements shown in FIG. 2 should not be considered to be either necessary or exclusive. For example, the infrared detector portion could be omitted and individual user apparatus would still perform adequately, although it would not, of course, be remotely controllable. In addition, specialized interfaces with special brands and/or models of television sets may be provided to gain even greater control over the system, depending upon the capabilities of the various interfaces available.

Figure 3:
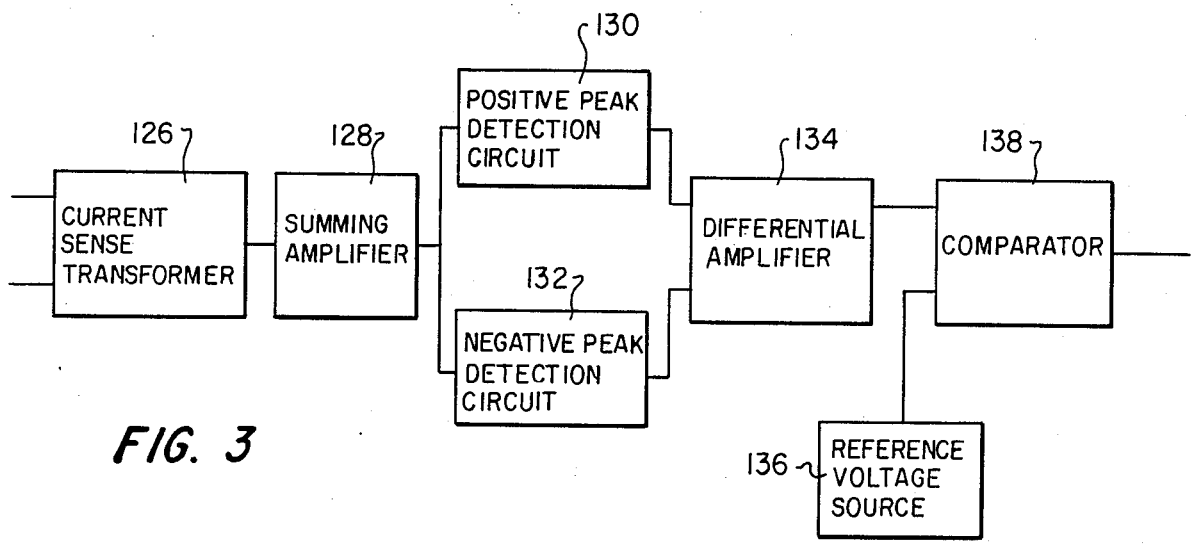
FIG. 3 is a block diagram of a current detection circuit constructed in accordance with the teachings of the present invention.

Referring now to FIG. 3, a very general block diagram of a current sense or detection circuit constructed in accordance with the present invention is shown. The current detection circuit of FIG. 3 could be employed in block 124 of FIG. 2, and includes a current sense transformer 126. The primary winding of transformer 126 has current passing therethrough from an AC source to a device being monitored. The secondary winding of transformer 126 is connected to the input terminals of a summing amplifier 128. The purpose of the summing amplifier 128 is to perform a current to voltage conversion on the output of transformer 126.

The output voltage of summing amplifier 128 is directed through a positive peak detection circuit 130 and a negative peak detection circuit 132 connected in parallel. These two peak detection circuits are capable of producing voltage levels equal to the maximum positive excursion and minimum level, respectively, of the output voltage of summing amplifier 128.

The outputs of the positive peak detection circuit 130 and the negative peak detection circuit 132 are fed into the two input terminals of a differential amplifier 134. The differential amplifier 134 operates to produce an output voltage that is directly proportional to the difference between its two input voltages. Since the two input voltages of the differential amplifier 134, that is, the respective output voltages of the positive peak detection circuit 130 and the negative peak detection circuit 132, are directly proportional to the peak to peak levels of the output voltage of summing amplifier 128, and the output voltage of summing amplifier 128 is directly proportional to the AC line current, the output voltage from differential amplifier 134 is directly proportional to the peak to peak AC line current.

The output voltage of differential amplifier 134 and a reference voltage from a reference voltage source 136 are fed into a comparator 138, the output voltage of which can indicate whether the AC device being monitored is powered at a full operational or a less than full operational level.

Figure 4:
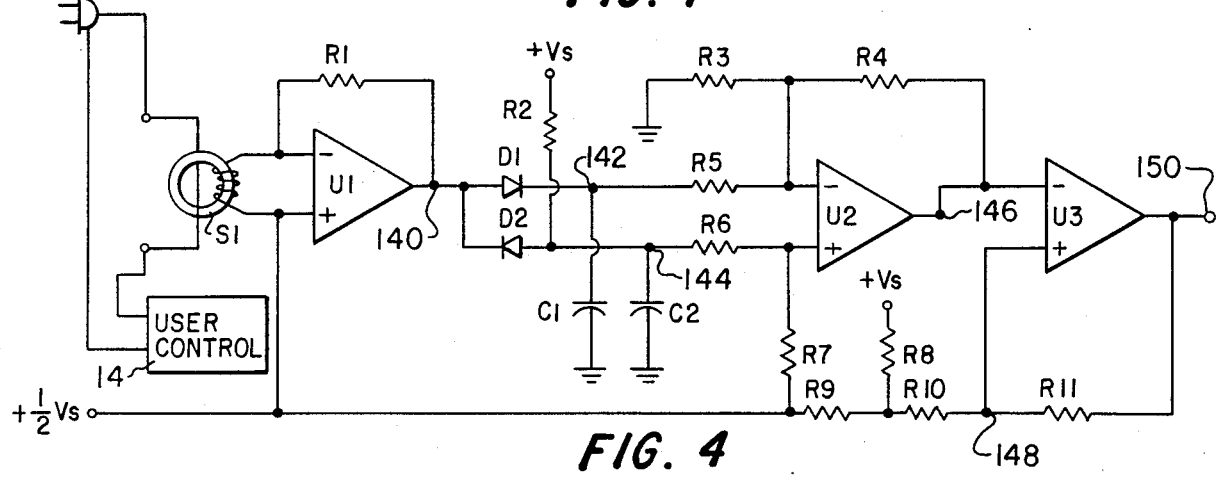
FIG. 4 is a detailed schematic diagram of a current detection circuit constructed in accordance with the teachings of the present invention.

Referring now to FIG. 4, a specific circuit having the characteristics described with reference to the block diagram of FIG. 3 is shown therein.

Those skilled in the art will recognize and appreciate that current sense transformer S1 would likely have a primary winding simply passing once through a toroid and that the secondary winding would be turned around the toroid a predetermined number of times, e.g., 450 times. Those skilled in the art should further recognize that with current sense transformer S1 connected to a low impedance load, the output current of the transformer S1 will be related to the transformer's turns ratio T by the following formula:

$$i_{out} = i_{in}/T$$

Operational amplifier U1 and resistor R1 form a conventional summing amplifier. Those skilled in the art should recognize that the voltage ($V_1$) on output pin 140 of operational amplifier U1 is described by the formula:

$$V_1 = i_{out} R1 + 0.5 V_s$$

Diode D1 and capacitor C1 form a positive peak detector circuit. Those skilled in the art should recognize that assuming that the time represented by the inverting input circuit of operational amplifier U2 is large compared to the period of the AC current wave form, capacitor C1 will charge to a voltage level $V_2$ (at point 142) equal to the maximum positive excursion of $V_1$ (at point 140).

Diode D2 and capacitor C2 form a negative peak detection circuit. Those skilled in the art should recognize that assuming that the time constant of the non inverting input side of operational amplifier U2 is large compared to the period of the AC current wave form, capacitor C2 will charge to a voltage level $V_3$ (at point 144) equal to the minimum level of voltage $V_1$ (at point 140).

From the foregoing, it should be appreciated that voltage levels $V_2$ and $V_3$ at points 142 and 144, respectively, represent the maximum and minimum levels of voltage $V_1$.

Those skilled in the art should further recognize that the circuit represented by resistor R4, resistor R5, resistor R6, resistor R7 and operational amplifier U2 is a differential amplifier. Output pin 146 of operational amplifier U2 will have a voltage level $V_4$ directly proportional to the difference between voltage level $V_2$ and voltage level $V_3$. Since voltage level $V_2$ and voltage level $V_3$ are directly proportional to the peak to peak level of voltage level $V_1$ and voltage level $V_1$ is directly proportional to the AC line current, voltage level $V_4$ is proportional to the peak to peak AC line current.

Operational amplifier U2 performs the comparator function. Voltage level $V_4$ (at point 146) is compared to a reference voltage $V_6$ (at point 148). The output voltage $V_5$ (at point 150) of operational amplifier U3 may then indicate whether the AC device is powered on or not. For example, if the value of the current drawn by a fully on system (e.g. a television and clock) is a certain value, and the value of the current drawn by a partially on system is a percentage (e.g., 10%) of the value of the fully on system, a reference voltage $V_6$ may be selected to discriminate, in conjunction with voltage $V_4$, between the fully on state and the partially on state. Reference voltage $V_6$ effectively serves as a means for establishing a threshold between the partially on and fully on conditions. Comparator 138 performs amplitude selection between a variable and a constant. $V_5$ indicates partial or less than full operation when $V_6$ is less than $V_4$; on the other hand, $V_5$ indicates full operation (during which, in part, the keyboard assembly should be enabled to allow pay movie selection) when $V_6$ is greater than $V_4$. As output $V_5$ of current sense circuit 124 is an input of data processing section 70 (as shown in FIG. 2), information relayed to data processing section 70 (i.e., whether or not the set is fully operational) may be employed by that section 70 to enable or disable, as appropriate, various other system 14 subelements, discussed above and shown in FIG. 2.

The various other resistors in the circuit perform biasing functions and other functions that should be readily understood and appreciated by those skilled in the art.

Those skilled in the art should further appreciate that it is desirable to have a circuit that is compatible for use with a large number of television systems. Accordingly, but also purely by way of example, representative values of the various circuit components that have been found particularly effective in an application such as the Spectravision ® system are set forth below:

| Designation | Value or Component |
| --- | --- |
| Resistor R1 | 3.9K |
| Resistor R2 | 1M |
| Resistor R3 | 1.2M |
| Resistor R4 | 1M |
| Resistor R5 | 1M |
| Resistor R6 | 1M |
| Resistor R7 | 1M |
| Resistor R8 | 10K |
| Resistor R9 | 10K |
| Resistor R10 | 10K |
| Resistor R11 | 1M |
| Capacitor C1 | 10 uf |
| Capacitor C2 | 10 uf |
| Operational amplifier U1 | LM324 |
| Operational amplifier U2 | LM324 |
| Operational amplifier U3 | LM324 |

Figure 5:
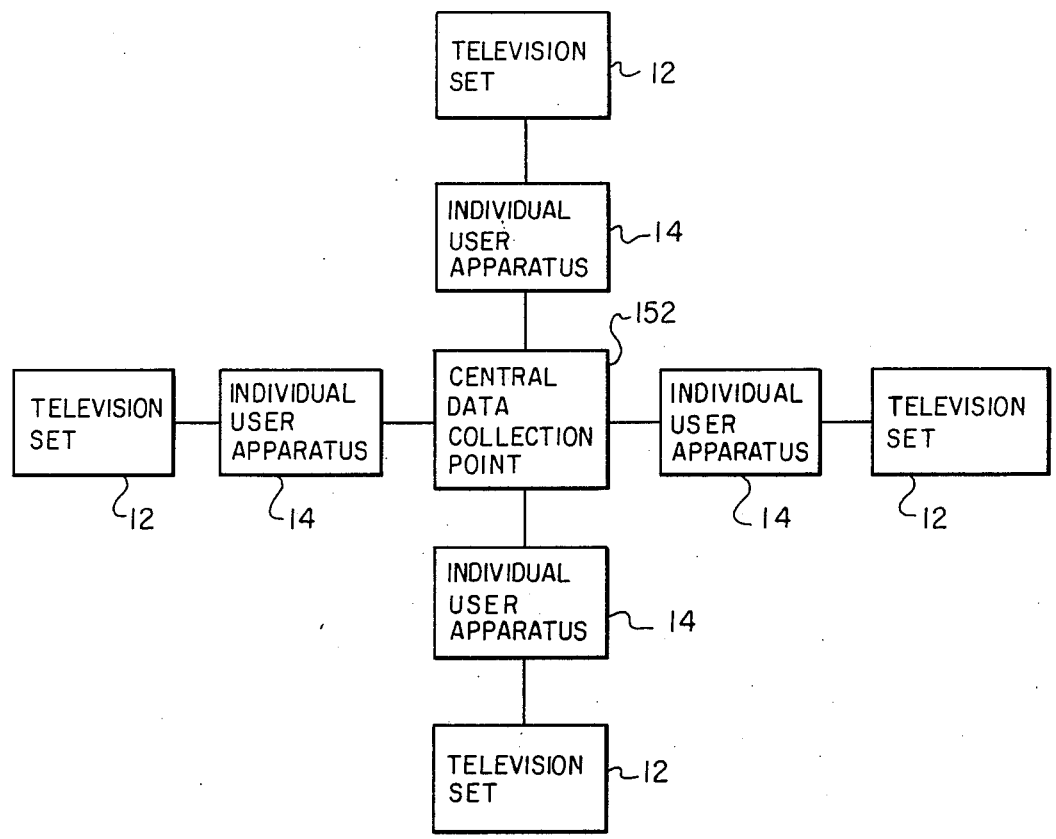
FIG. 5 is a block diagram of a system for collecting data indicative of the popularity of particular television programs, in which system the circuit and method of the present invention may be employed.

Referring now to FIG. 5, a system, such as the Nielsen rating system, for collecting data indicative Of the popularity of particular television programs is shown. Basically, such a system comprises a number of television sets 12 with associated user apparatus 14, all of which are connected to a central data collection point 152. As previously mentioned, at central data collection point 152 information is collected and tabulated to produce statistically correlated popularity ratings of individual television programs in different markets. As should be readily apparent to those skilled in the art, based on the teachings set forth herein, the circuit and method of the present invention may be usefully employed in such a system, e.g., to disable monitoring portions of apparatus 14 when television set 12 is off, notwithstanding presence and operation of current consuming elements (e.g., instant on circuitry) associated with television set !2, to, e.g., conserve power.

It is thus believed that the operation and construction of the present invention will be apparent from the foregoing description. While the method and apparatus shown and described has been characterized as being preferred it will be obvious that various changes and modifications may be made therein without departing from the spirit and scope of the invention.

What is claimed is:

1. An apparatus for sensing operational status of a television system, including a television set, said apparatus comprising:
   a reference voltage source,
   a current sensing element,
   means for determining a level of operation of said system comprising first voltage generating means for generating a voltage output directly related to current sensed by said sensing element, second voltage generating means for generating a maximum positive excursion voltage directly related to current sensed by said sensing element, third voltage generating means for generating an other voltage directly related to the minimum level of voltage directly related to current sensed by said sensing element,
   means for producing a differential output voltage proportional to the difference between said maximum positive excursion voltage and said other voltage, and
   means for comparing said level of operation to said reference voltage source,
   wherein said current sensing element comprises a current sense transformer, wherein said first voltage generating means comprises a summing amplifier, wherein said second voltage generating means element comprises a positive peak detection circuit, wherein said third voltage generating means comprises a negative peak detection circuit, wherein said means for producing said differential output voltage comprises a differential amplifier, and wherein said means for comparing said level of operation of said system to said reference voltage source comprises a comparator.

2. An apparatus as recited in 1, wherein said apparatus operates so as to provide information as to programs viewed on said television set.

3. An apparatus as recited in claim 2, wherein said television set is adapted to receive videotaped movie signals, and wherein said apparatus operates so as to provide information as to whether said television set is in a state so as to be capable of showing said videotaped signals.

4. An apparatus for monitoring a television set system operated by alternating current from an alternating current source, said apparatus being adapted to be connected in circuit between said alternating current source and said television set system to be monitored, said apparatus further comprising:
   means for converting alternating current to a voltage, said voltage having a positive peak and a negative peak;
   means for detecting said positive peak of said voltage; and means for detecting said negative peak of said voltage.

5. An apparatus as recited in claim 4, further comprising:
   means for transmitting signals to said system.

6. An apparatus as recited in claim 5, wherein said signals comprise broadcast signals.

7. An apparatus as recited in claim 6, wherein said signals further comprise played videotaped signals.

8. An apparatus as recited in claim 7, further comprising means for a viewer to select a portion of said broadcast signals for viewing.

9. An apparatus as recited in claim 8, further comprising means for a viewer to select a portion of said played videotaped signals for viewing.

10. An apparatus as recited in claim 9, wherein said signals further comprise polling signals.

11. A current detection circuit for a television system including a television set, said circuit comprising:
   a current sense transformer having a primary winding interconnecting an AC line source and a television device to be monitored, said current sense transformer further having a secondary winding with connectable end points;
   a summing amplifier having two input terminals, each connected to one of said connectable end points of said secondary winding of said current sense transformer, said summing amplifier further having an output terminal;
   a positive peak detection circuit having an input terminal and an output terminal, said input terminal connected to said output terminal of said summing amplifier;
   a negative peak detection circuit having an input terminal and an output terminal, said input terminal connected to said output terminal of said summing amplifier;
   a differential amplifier having two input terminals and an output terminal, one of said input terminals connected to said output terminal of said positive peak detection circuit, the other of said input terminals connected to the output terminal of said negative peak detection circuit;

a reference voltage source having an output terminal; and a comparator having two input terminals and an output terminal, one of said input terminals connected to the said output terminal of said differential amplifier, the other of said input terminals connected to the output terminal of said reference voltage source.

12. A circuit as recited in claim 11, wherein said system further comprises:

means for means for determining whether said television set is on or off; and means for determining what a viewer watches on said television set.

13. A circuit as recited in claim 12, wherein said system further comprises:

means for indicating whether said viewer should be billed based upon what said viewer watches on said television set.

14. A circuit as recited in claim 12, wherein said system further comprises:

means for indicating an amount said viewer should be billed based upon what said viewer watches on said television set.

15. A method for sensing operational status of a television set system comprising the steps of:

establishing a reference value;

determining a level of activity of said system; and comparing said level of activity of said system to said reference value, wherein said step of determining a level of activity of said system comprises the steps of:

sensing current;

performing a current to voltage conversion; and determining peak values of said voltage arrived at by said current to voltage conversion.

* * * * *